(12) United States Patent
Moschini

(10) Patent No.: US 6,458,297 B2
(45) Date of Patent: Oct. 1, 2002

(54) METHOD FOR PRODUCING PRESSURE DIE-CAST OR INJECTION MOULDED ARTICLES USING SALT CORES

(75) Inventor: Renzo Moschini, Bologna (IT)

(73) Assignee: Magneti Marelli S.p.A. (IT)

( * ) Notice: Subject to any disclaimer, the term of this patent is extended or adjusted under 35 U.S.C. 154(b) by 0 days.

(21) Appl. No.: 09/169,970

(22) Filed: Oct. 13, 1998

(30) Foreign Application Priority Data

Oct. 14, 1997 (IT) .......................................... B097A0615

(51) Int. Cl.[7] .................................................. B29B 9/12
(52) U.S. Cl. ........................... 264/12; 164/37; 164/132; 164/138; 249/61; 264/37; 425/6
(58) Field of Search ............................. 425/6, DIG. 50, 425/317, 142; 134/72; 96/270, 243, FOR 11; 264/12, 317, 6, 123, 115, 221, 219; 249/61; 164/522, 37, 132, 138

(56) References Cited

U.S. PATENT DOCUMENTS

| | | | | |
|---|---|---|---|---|
| 2,308,992 A | * | 1/1943 | Mertens .......................... 252/97 |
| 2,587,071 A | * | 2/1952 | Sprauer ............................ 23/86 |
| 2,901,435 A | * | 8/1959 | Robson ........................ 252/187 |
| 3,329,528 A | | 7/1967 | Aldrich ..................... 134/22.15 |
| 3,356,129 A | * | 12/1967 | Anderko et al. ............. 164/138 |
| 3,694,264 A | | 9/1972 | Weinland et al. ........ 134/22.11 |
| 3,801,334 A | * | 4/1974 | Dewey, Jr. .................. 106/38.3 |
| 3,963,818 A | * | 6/1976 | Sakoda et al. ................. 264/56 |
| 4,231,806 A | * | 11/1980 | Henry ............................ 134/18 |
| 4,504,457 A | * | 3/1985 | Saeman ........................ 423/474 |
| 4,687,133 A | * | 8/1987 | Karlstedt ......................... 237/2 |
| 4,756,838 A | * | 7/1988 | Veltman ......................... 252/1 |
| 4,810,284 A | * | 3/1989 | Auran et al. ................... 75/338 |
| 4,842,841 A | * | 6/1989 | Saeman ........................ 423/474 |
| 4,871,489 A | * | 10/1989 | Ketcham ......................... 264/9 |
| 5,058,514 A | * | 10/1991 | Mozes et al. ................ 110/345 |
| 5,303,761 A | * | 4/1994 | Flessner et al. ................ 164/15 |
| 5,456,364 A | * | 10/1995 | Lambert ...................... 209/382 |
| 5,628,937 A | * | 5/1997 | Oliver et al. ..................... 264/9 |
| 5,935,380 A | * | 8/1999 | White et al. ................ 159/48.1 |
| 6,086,722 A | * | 7/2000 | Webste, Jr. et al. ........... 203/12 |
| 6,156,247 A | * | 12/2000 | Moschini et al. ............. 264/12 |
| 6,162,377 A | * | 12/2000 | Ghosh et al. ................... 264/9 |

FOREIGN PATENT DOCUMENTS

| | | |
|---|---|---|
| EP | 0501549 | 9/1992 |
| EP | 0613742 | 9/1994 |
| FR | 1226530 | 7/1960 |
| FR | 2009857 | 2/1970 |
| FR | 2156634 | 6/1973 |

OTHER PUBLICATIONS

Office Action (Paper No. 3), dated Apr. 25, 2001, Exam. Chabaji, M., in response in papers filed Oct. 18, 2000 in Applicant's co-pending U.S. patent application Ser. No. 09/690,817 (grp. unit 1744 (SRE R. J. Warden Sr.).
U.S. patent application Ser. No. 09/690,817 (SPE R.J. Warden Sr.).

* cited by examiner

Primary Examiner—James P. Mackey
Assistant Examiner—Emmanuel Luk
(74) Attorney, Agent, or Firm—Hall, Priddy, Myers & Vande Sande

(57) ABSTRACT

Method for producing pressure die-cast or injection moulded articles having a unit for producing salt grains, a press for forming salt filler cores by compressing the said salt grains, a pressure die-casting machine for making the said articles by injecting a material in the liquid state into a mould having at least one salt filler core, and a salt removal and washing unit designed to remove the salt filler cores that have been trapped within the said articles; the said unit for producing salt grains being designed to atomize a saline solution which is supersaturated with salt into a plurality of drops so as subsequently to cause the salt present in solution/suspension in each drop of solution to solidify into a corresponding salt grain.

9 Claims, 3 Drawing Sheets

METHOD FOR PRODUCING PRESSURE DIE-CAST OR INJECTION MOULDED ARTICLES USING SALT CORES

BACKGROUND OF THE INVENTION

The present invention relates to a plant for producing pressure die-cast or injection moulded articles using salt cores.

As is known, pressure die-cast or injection moulded articles are produced by injecting a material in liquid form—either a metal (for example aluminium) or a plastic (for example polyamides)—into a mould bearing a negative impression of the desired article. It is common practice, moreover, to place one or more filler cores inside the mould so as to produce articles with cavities and/or apertures of a particular shape.

For some time now, the problems connected with the need to extract the filler cores from within the article once the material injected into the mould has solidified have led those working in the field to examine the possibility of making the filler cores by compressing salt grains (for example sodium chloride grains) inside moulds bearing a negative impression of the core shape. Indeed, such a solution would enable the filler cores to be removed from within the article simply by washing the said article with a liquid solvent (for example water) capable of dissolving the salt grains, and would also make it possible to adopt design solutions which could not otherwise be used with conventional techniques.

At present, however, the use of salt filler cores is very much limited by the difficulty in obtaining sufficient quantities of salt grains having suitable morphological characteristics to satisfy—at an industrially acceptable cost—the requirements of a plant for producing pressure die-cast or injection moulded articles.

Through experimentation, it has been observed that, in order to withstand the stresses generated during injection of the material in a liquid state into the mould, the salt filler cores need to be extremely compact and, consequently, the shape and particle size of the salt grains used to produce these cores have to be such as to ensure that the maximum possible density is achieved once the salt grains have been compressed inside the moulds for producing the cores.

At present, salt grains that are suitable for producing salt filler cores are only obtained after a lengthy and expensive process involving, firstly, a grinding stage in which generic salt agglomerates are fed into grinders from which salt grains of varying particle size are obtained and, subsequently, a grading stage in which the salt grains produced by the grinders are conveyed into screening machines capable of separating from the stream of salt grains those salt grains that are of a suitable size for producing the salt cores referred to above.

The production process described above has the great disadvantage of giving a low specific yield; consequently, in order to ensure that enough salt grains are produced to satisfy the needs of a plant for producing pressure die-cast or injection moulded articles, the number of grinders and screening machines needed would be such as to make construction of the plant unfeasible on account of the excessive costs involved. Furthermore, the salt grains obtained using the production process described above have many sharp edges which do not particularly lend themselves to achieving high levels of compaction.

SUMMARY OF THE INVENTION

The object of the present invention is, therefore, to provide a plant for producing pressure die-cast or injection moulded articles using salt filler cores which does not have the disadvantages listed above.

According to the present invention, a plant is provided for producing pressure die-cast or injection moulded articles using salt cores, characterized in that it comprises a unit for producing salt grains having a shape and particle size suitable for producing salt filler cores; a press designed to make at least one said salt filler core by compacting a given quantity of salt grains; and a pressure die-casting machine designed to produce the said pressure die-cast or injection moulded articles by injecting a material in the liquid state into a mould containing at least one salt filler core produced by the said press; the said unit for producing salt grains being designed to atomize a saline solution into a plurality of drops and to cause the salt contained in each drop to solidify into a corresponding salt grain.

BRIEF DESCRIPTION OF THE DRAWINGS

The present invention will now be described with reference to the appended drawings which illustrate a non-limiting embodiment thereof, in which.

DETAILED DESCRIPTION OF THE INVENTION

Figure 1:
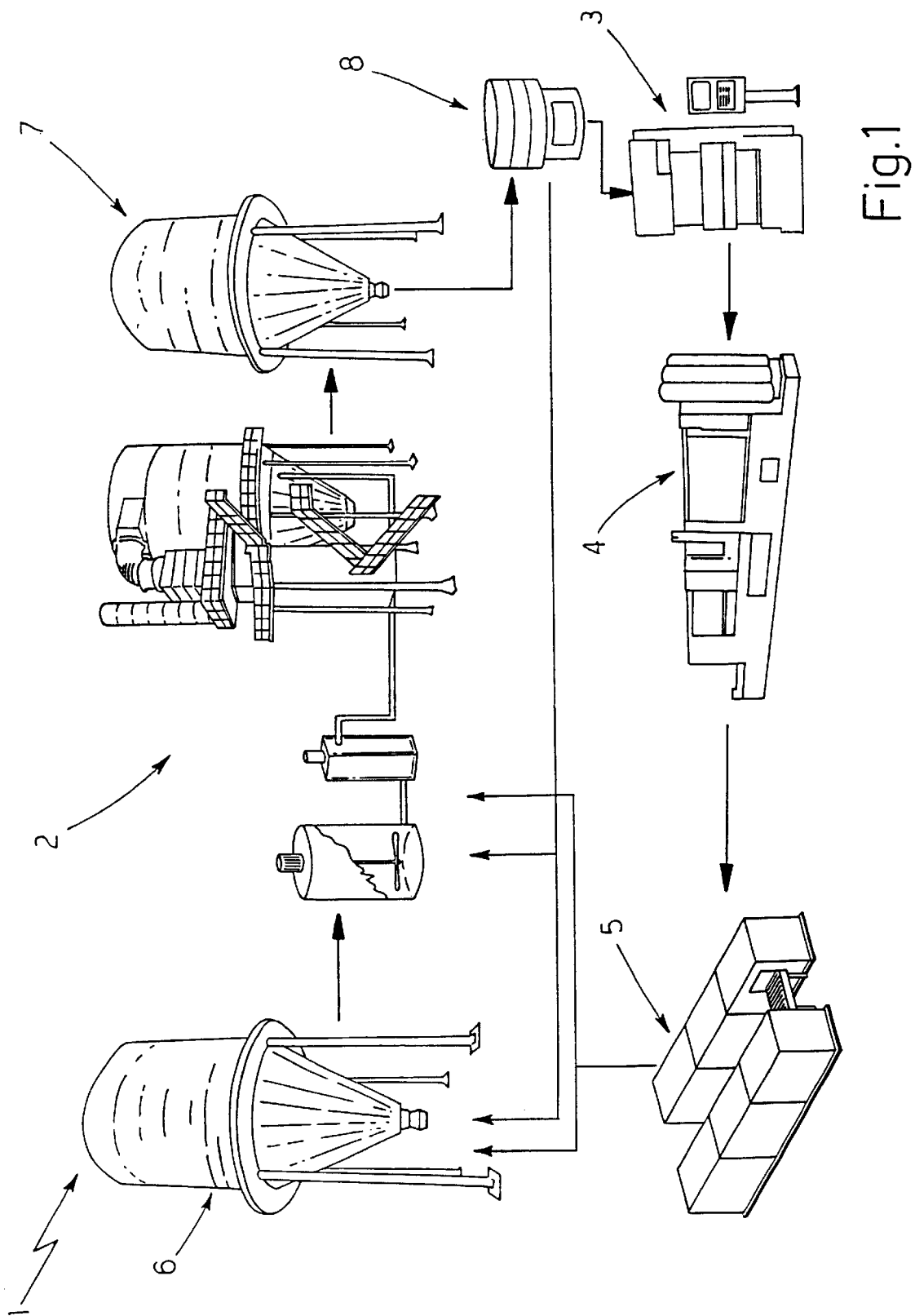
FIG. 1 diagrammatically illustrates a plant for producing pressure die-cast or injection moulded articles constructed according to the teachings of the present invention.

With reference to FIG. 1, the reference numeral 1 denotes, overall, a plant that uses salt filler cores for producing pressure die-cast or injection moulded articles.

The plant 1 comprises a unit 2 for processing generic salt agglomerates (for example sodium chloride agglomerates) into salt grains having a shape and particle size suitable for producing salt filler cores; a press 3 designed to compress the salt grains inside moulds bearing a negative impression of the shape of the filler cores needed to produce the abovementioned pressure die-cast or injection moulded articles; a conventional pressure die-casting machine 4 designed to produce the abovementioned articles by injecting a material in the liquid state—either a metal (for example aluminium) or a plastic (for example polyamides)—into a mould containing one or more salt filler cores produced by the press 3; and, lastly, a salt removal and washing unit 5 designed to remove the salt filler cores that have been trapped within the articles from the said articles as they leave the pressure die-casting machine 4.

Preferably, but not necessarily, the plant 1 also comprises a container 6 for storing the salt agglomerates which are converted into salt grains by the unit 2; a container 7 for collecting and storing the salt grains output by the unit 2; and, optionally, a vibrating screen 8 of known type located upstream of the press 3 and designed to grade the salt grains coming out of the unit 2 and/or the container 7 so as to convey to the press 3 only those salt grains that are suitable for producing the salt filler cores, conveying the remaining salt grains back to the container 6 or to the unit 2.

In the example illustrated, the press 3 for making the salt filler cores is a conventional press for producing components by compacting metallic powders such as, for example, the MANNESMAN DEMAG E2 series press, model HPM 150, while the salt removal and washing unit 5 is designed to convey the salt removed from the pressure die-cast or injection moulded articles to the container 6 and/or to the unit 2 so that it can be used again to produce salt grains.

The unit 2 produces the abovementioned salt grains having a shape and particle size suitable for producing salt filler cores by dissolving the salt from the container 6, the salt removal and washing unit 5 and/or the vibrating screen 8 in a liquid solvent in order to obtain a saline solution which is preferably, but not necessarily, supersaturated with salt; by subsequently atomizing the abovementioned saline solution into minute drops which are all of approximately the same size; and, lastly, by evaporating the liquid solvent present in each drop of saline solution so as to cause the salt in solution/suspension in the drop of saline solution to solidify into a corresponding salt grain of essentially spherical shape.

Given that the dimensions of the salt grains depend essentially on the dimensions of the drops of saline solution, the unit 2 produces a stream of salt grains which are all of approximately the same size. Consequently, by suitably selecting the size of the drops of saline solution, it is possible to obtain a stream of salt grains having a shape and particle size suitable for producing salt filler cores, that is having an essentially spherical shape with a diameter of preferably, but not necessarily, between 100 and 300 $\mu$m.

Figure 2:
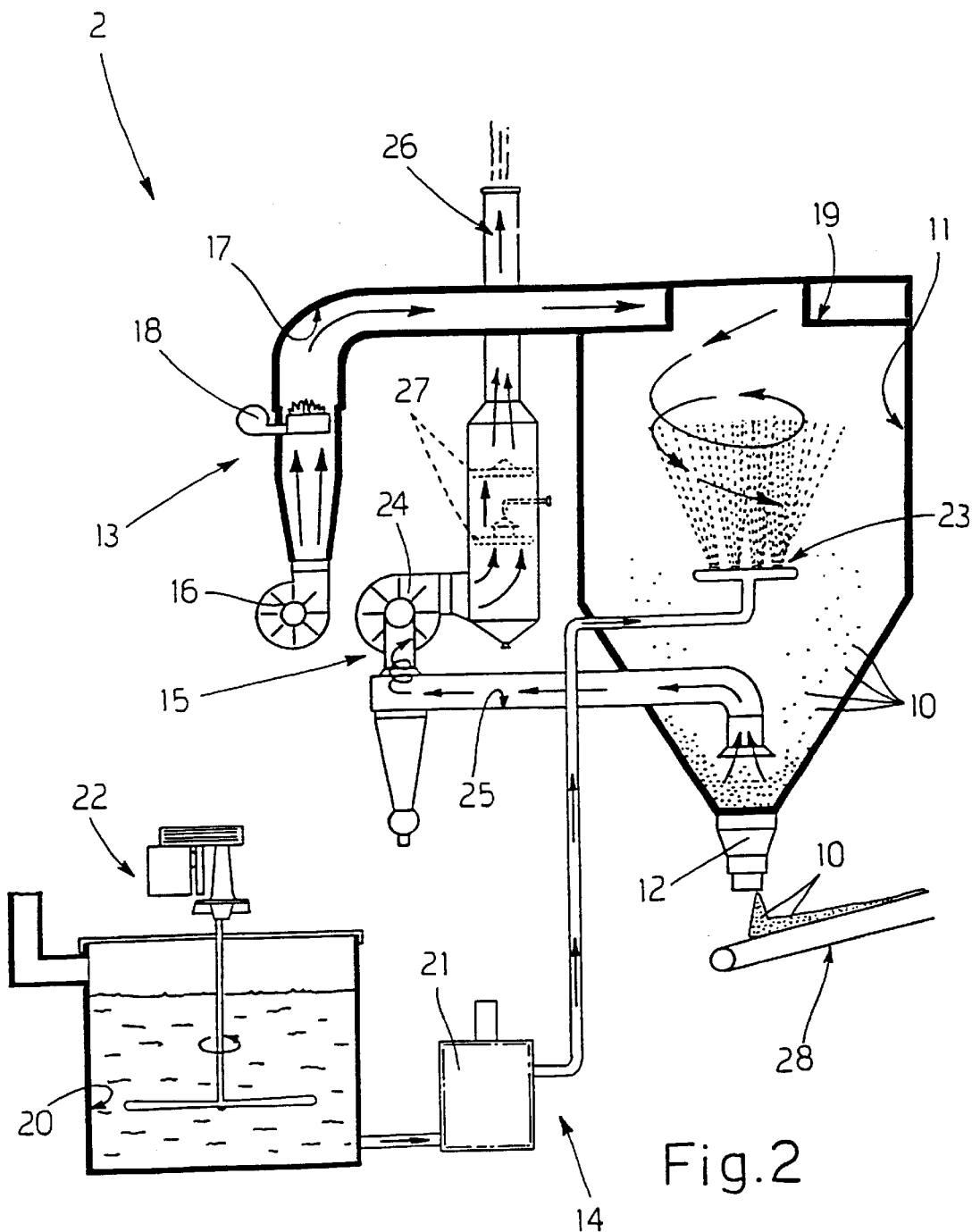
FIG. 2 diagrammatically illustrates a first detail of the plant illustrated in FIG. 1.

With reference to FIG. 2, the unit 2 for producing the abovementioned salt grains, hereinafter denoted by the reference 10, comprises a drying tower 11 with an outlet mouth 12 at the bottom from which the salt grains 10 having a given particle size come out; a hot air feed unit 13 designed to convey a stream of air at a given temperature into the drying tower 11; a salt solution feed unit 14 designed to atomize a liquid solvent containing salt in solution inside the drying tower 11; and, lastly, a hot air discharge unit 15 designed to convey the hot air generated by the hot air feed unit 13 out of the drying tower 11.

In the example illustrated, the hot air feed unit 13 in turn comprises a blower unit 16 of known type which is designed to convey a stream of air of given value through a feed pipe 17 and into the drying tower 11, and a burner 18 of known type which is located along the feed pipe 17, downstream of the blower unit 16, and is designed to bring the stream of passing air to a temperature of preferably, but not necessarily, between 400° C. and 700° C. The hot air feed unit 13 lastly comprises an air dispenser 19 which is located inside the drying tower 11 and is designed to impart a preferably, but not necessarily, spiral-like trajectory to the stream of hot air coming from the feed pipe 17.

The salt solution feed unit 14, on the other hand, comprises a mixing tank 20, inside which the salt is dissolved in the abovementioned liquid solvent, and a pump unit 21 designed to convey the liquid solvent containing salt in solution from the mixing tank 20 to the drying tower 11 at a pressure of preferably, but not necessarily, between 2 and 4 bar.

In the example illustrated, the mixing tank 20 is fitted with a mixing device 22 of known type designed to stop the salt suspended in the liquid solvent precipitating at the bottom of the said mixing tank 20.

The salt solution feed unit 14, on the other hand, comprises an atomizing device 23 designed to atomize the liquid solvent coming from the pump unit 21 inside the drying tower 11 in such a way that the atomized liquid solvent comes into contact with the stream of hot air produced by the hot air feed unit 13. In the example illustrated, the atomizing device 23 comprises one or more atomizing nozzles which are positioned inside the drying tower 11, upstream of the outlet mouth 12, and point towards the dispenser 19 so that the liquid solvent containing the salt in solution is atomized counter to the stream of hot air, which is travelling in the opposite direction. Needless to say, alternative configurations are possible in which the liquid solvent is atomized in the same direction as the direction of travel of the stream of hot air, in other words in co-current.

With reference to FIG. 2, the hot air discharge unit 15 in turn comprises a suction unit 24 designed to suck the hot air from inside the drying tower 11 through a suction pipe 25, the inlet of which is located inside the drying tower 11, directly upstream of the outlet mouth 12, and a chimney 26 designed to convey the hot air sucked up by the suction unit 24 to the outside. In the example illustrated, filtering devices 27 of known type (for example electrostatic precipitators or wet-type filters) are found both upstream and downstream of the suction unit 24, their function being to extract and recover the particles suspended in the hot air drawn from the drying tower 11.

Lastly, the unit 2 has a conveyor 28 for conveying the salt grains 10 coming out of the outlet mouth 12 to the container 7, to the vibrating screen 8 or directly to the press 3.

Figure 3:
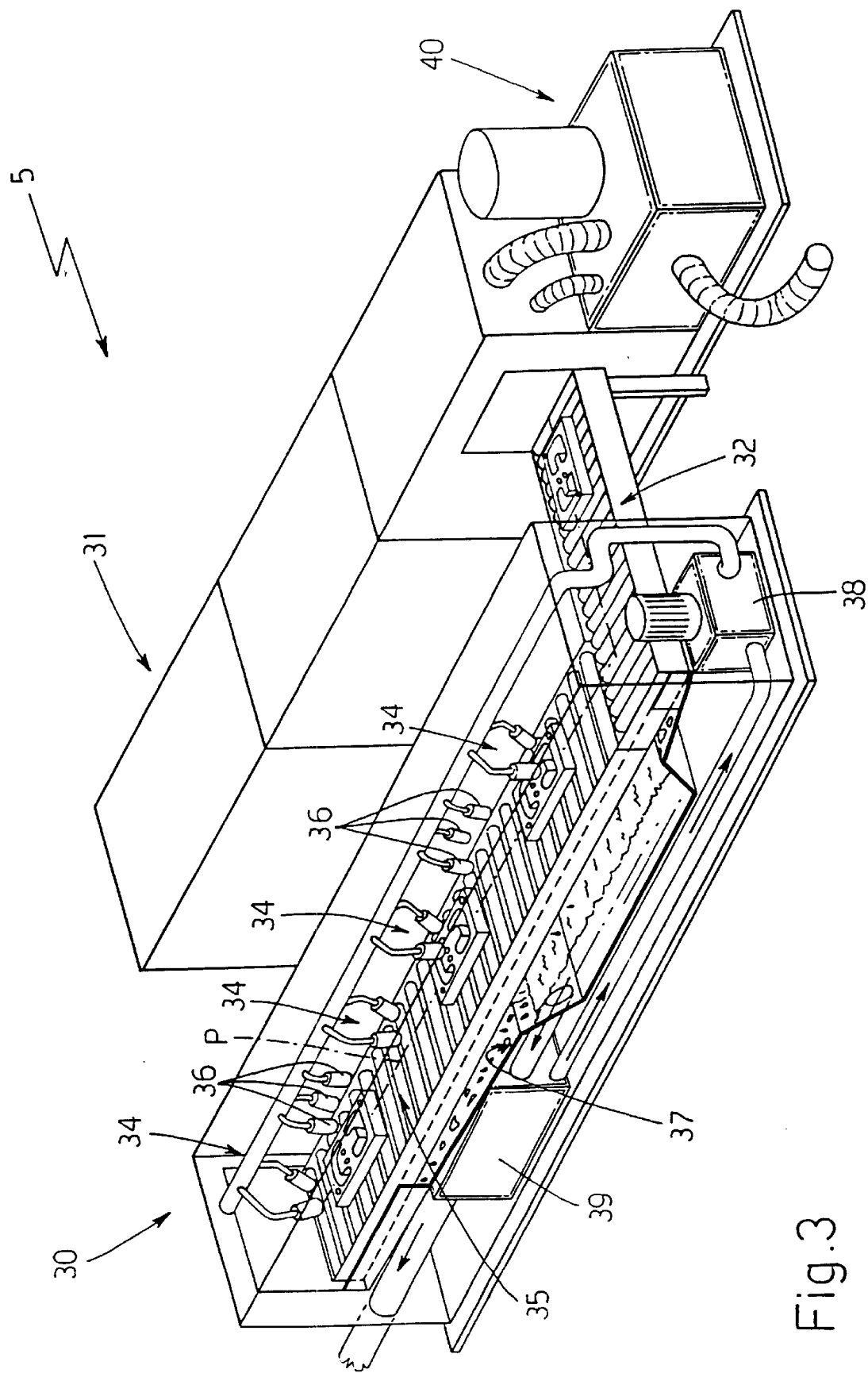
FIG. 3 illustrates a diagrammatic perspective view of a second detail of the plant illustrated in FIG. 1.

With reference to FIG. 3, the salt removal and washing unit 5 comprises a cleaning machine 30 designed to remove most of the salt that makes up the filler cores from the articles output by the pressure die-casting machine 4, a washing machine 31 designed to remove any salt residues left within the articles once the latter have passed through the cleaning machine 30 and, lastly, a conveyor 32 designed to convey the articles from the cleaning machine 30 into the washing machine 31.

In the example illustrated, the cleaning machine 30 comprises a washing tunnel 33, inside which there are a plurality of washing stations 34, and a conveyor 35 designed to advance the articles produced by the pressure die-casting machine 4 inside the washing tunnel 33 along a path P that passes successively through all the washing stations 34.

Each washing station 34 in the cleaning machine 30 has a plurality of nozzles 36, each of which is designed to spray one or more jets of a saline solution—preferably, but not necessarily, containing the same salt as that used to make the abovementioned filler cores—on to the articles carried by the conveyor 35.

In the example illustrated, the saline solution is a saline solution which is saturated or supersaturated with salt so as to make it easier to recover the salt that makes up the filler cores. If a saline solution saturated with salt is used, the filler cores are broken up by the mechanical action of the jets alone. If a saline solution supersaturated with salt is used, the filler cores are broken up by the mechanical action of the jets and by the abrasive action of the salt suspended in the supersaturated saline solution.

The cleaning machine 30 also comprises a recovery tank 37 located underneath the conveyor 35 to recover the saline solution which has been sprayed on to the articles and which thus carries in suspension the salt from which the filler cores are made, a pump unit 38 designed to draw the saline solution from the recovery tank 37 so as to convey it to the nozzles 36 at a given pressure and, lastly, a filtering device 39 designed to extract the excess salt from the saline solution collected in the recovery tank 37 and convey it to the container 6 and/or to the mixing tank 20 to be reused.

A centrifugal filter of the type currently used in the optics industry for recovering cerium oxide from processing waters can effectively be used as a filtering device 39.

The washing machine 31, on the other hand, is a conventional machine for washing parts, such as for example the SYNCRO 02/1000 washing machine produced by PA-DA S.N.C., optionally combined with a desalinating device 40 of known type which is designed to recover from the washing water of the washing machine 31 any salt that is left on the pressure die-cast or injection moulded articles after they have passed through the cleaning machine 30.

The way in which the plant 1 works will now be described. It has been assumed that the press 3 produces only one filler core at a time, that the pressure die-casting machine 4 produces only one pressure die-cast or injection moulded article at a time and that this article is obtained using only one salt filler core.

During operation, the salt and the liquid solvent are poured into the mixing tank 20 in order to obtain the supersaturated saline solution. The supersaturated saline solution is then atomized into minute drops inside the drying tower 11, where the stream of hot air causes the liquid solvent contained in each drop of saline solution to evaporate, thereby forcing the salt in solution/suspension in each drop of saline solution to solidify into a corresponding salt grain 10 of essentially spherical shape. Once solidification has taken place, the salt grains 10 fall under the effect of gravity to the bottom of the drying tower 11 where they pass through the outlet mouth 12 and on to the conveyor 28 which conveys the salt grains 10 into the container 7.

The amount of salt needed to produce a single salt core is then taken from the container 7 and conveyed to the press 3, optionally first passing through the vibrating screen 8. Once the press has compacted the salt grains 10 to make the salt filler core, a robot arm (of known type and not illustrated) takes the filler core from the press and positions it inside the mould of the pressure die-casting machine 4.

After the filler core has been placed inside the mould of the pressure die-casting machine 4, the material in the liquid state is injected into the mould so as to produce the pressure die-cast or injection moulded article with the desired shape.

Once the material injected into the mould has solidified, the article—which contains the filler core trapped inside it—is then conveyed to the salt removal and washing unit 5 where the filler core is broken up and the salt from which it was made is recovered. During its dwell time inside the cleaning machine 30, the article is sprayed with the jets of saturated or supersaturated saline solution, thereby causing the filler core trapped within the article to break up, whereas during its dwell time inside the washing machine 31, the article coming out of the cleaning machine 30 is subjected to conventional washing, involving repeated immersion in tanks containing liquid solvent that contains essentially no salt in solution, so as to remove the last residues of salt.

The main advantage of the plant 1 described above and illustrated is that it is extremely economical to build, therefore making the use of salt filler cores economically advantageous compared with conventional manufacturing methods.

In conclusion, it should be clear that modifications and variations can be made to the plant 1 described and illustrated herein without thereby departing from the scope of the present invention.

What is claimed is:

1. A method of making salt filler cores for producing pressure die-casts or injection molded articles, the steps comprising:

(a) producing a quantity of salt grains which are essentially spherical in shape and of substantially the same particle size;

(b) compacting said quantity of said salt grains into the shape of at least one salt filler core; and (c) injecting a liquid material from which said articles are to be made into a mold containing at least one said salt filler core to thereby form said article;

wherein said step of producing a quantity of said salt grains includes atomizing a saline solution into a plurality of drops and causing said salt contained in said drops to solidify into said grains of essentially spherical shape and having substantially the same size.

2. method according to claim 1 wherein said step of producing a quantity of said salt grains further includes:

providing a drying tower having an atomizing chamber therein, an inlet for emitting a stream of droplets into said chamber and an outlet for allowing said salt grains formed within said chamber to exit therefrom;

forming a stream of drops of said saline solution comprised of at least one salt in a liquid solvent; producing a stream of hot air; and contacting said streams of drops of said saline solution with said stream of hot air, thereby causing said liquid solvent to evaporate as said salt to solidify into said quantity of said salt grains.

3. A method according to claim 2 wherein when said article is so formed, said salt filler core is trapped within said article, and said method further includes washing said salt filler core with a liquid and removing said liquid and said core from said article.

4. A method according to claim 2 wherein said step of forming a stream of said drops includes storing said saline solution in a mixing tank, pumping said saline solution from said mixing tank to a plurality of atomizing nozzles located within said atomizing chamber at a given pressure.

5. A method according to claim 4 wherein said saline solution is supersaturated with said salt and said mixing tank includes a mixing device and wherein said method further comprises mixing said solution in said tank by using said mixing device in such a manner as to prevent said salt in said solution from precipitating to the bottom of said mixing tank.

6. A method according to 3 wherein said washing step includes the steps of breaking up said filler core trapped within said article, and washing said article clean of filler core material.

7. A method according to claim 3 or 6 wherein said washing step includes directing a plurality of jets of a saline solution at said article.

8. A method according to claim 3 or 6 wherein said washing step includes directing a plurality of jets of a saline solution comprised of the same salt as said saline solution used to make said salt grains.

9. A method according to claim 8 wherein said method further includes recovering said saline solution which has been sprayed on to the said article for breaking up and cleaning out said filler core, and using said recovered saline solution to form at least a portion of said plurality of jets.

* * * * *